United States Patent [19]

McCandless

[11] Patent Number: 4,501,138

[45] Date of Patent: Feb. 26, 1985

[54] DYNAMIC ENGINE POWER ASSESSMENT

[75] Inventor: James C. McCandless, Sheboygan, Wis.

[73] Assignee: International Harvester Co., Chicago, Ill.

[21] Appl. No.: 474,212

[22] Filed: Mar. 10, 1983

[51] Int. Cl.³ .................................. G01M 15/00
[52] U.S. Cl. ................................................. 73/116
[58] Field of Search .......................... 73/116, 117, 862

[56] References Cited

U.S. PATENT DOCUMENTS

| 3,581,561 | 6/1971 | Tomashek et al. | 73/117.2 |
|---|---|---|---|
| 3,592,053 | 7/1971 | Lucia | 73/116 |
| 3,817,092 | 6/1974 | Ludloff | 73/133 R |
| 3,938,377 | 2/1976 | Converse | 73/117 |
| 3,942,365 | 3/1976 | Hanson et al. | 73/116 |
| 3,994,160 | 11/1976 | Hanson | 73/116 |
| 4,292,670 | 9/1981 | Reid et al. | 73/116 |

Primary Examiner—John W. Caldwell, Sr.
Assistant Examiner—Ellwood G. Harding
Attorney, Agent, or Firm—Dennis K. Sullivan; F. David Aubuchon

[57] ABSTRACT

A dynamic engine power test method comprises operating the engine at a low speed, accelerating the engine at full throttle to a predetermined high speed, such as high idle, without absorbing or dissipating power therefrom, measuring the engine speed and elapsed time to determine the angular acceleration at specific speeds in the operating range of the engine or during one or more relatively small discrete speed intervals or windows preferably corresponding to peak torque speed, an intermediate point, rated speed, and a speed between rated speed and high idle. The torque output of the engine may be calculated manually or preferably automatically for each speed interval based on the equation $T = I\alpha$ wherein $\alpha$ is the angular acceleration at that speed and the horsepower for a nominal speed in the interval may also be calculated based on the torque.

11 Claims, 1 Drawing Figure

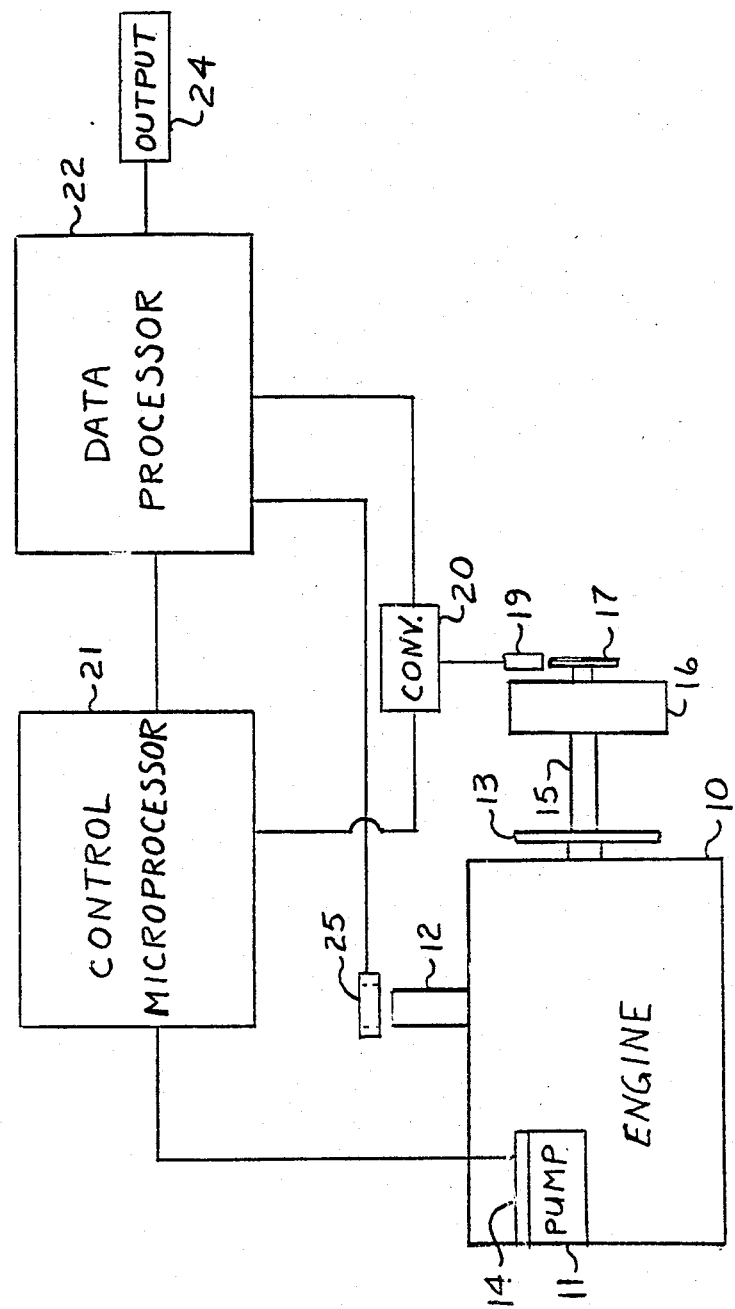

DYNAMIC ENGINE POWER ASSESSMENT

This invention relates to the testing of engines, primarily internal combustion engines produced in substantial volume, after the engines have been manufactured and, more particularly, to a method and apparatus for assuring that each engine tested is capable of producing the required torque or power for its application without the use of a dynamometer and in less time than would be taken in steady-state dynamometer testing.

In the manufacture of engines, particularly diesel engines for use in work application, such as trucks, farm tractors, and construction equipment, it is a practical necessity, indeed, a legal requirement in some instances, and a final quality control check that each engine can produce the full amount of power or torque which the manufacturer has claimed or advertised. Because of the complexity of engines, some manufacturers of industrial engines have felt it necessary to test every engine for power as it comes off the assembly line.

In the past, such tests were conducted by connecting the engine to a dynamometer and operating the engine under steady-state conditions at various speeds. For example, a diesel engine would be operated at high idle speed; a lower rated power speed, to assure that the engine delivered the advertised maximum power; a still lower peak torque speed, to be sure the engine produced the advertised torque rise (its capacity to do additional work although more slowly); and, perhaps, some intermediate speed. Although, this was somewhat time consuming, it was not of much concern because the engines were being run in at the same time, a process which could take several hours.

In more recent times, however, manufacturing methods and tolerance control have become substantially more sophisticated to the point where it is unnecessary to conduct an extended run-in on an engine except to check that the engine actually functions and to fix leaks. Because of these advances, the time required to check power has become significant, especially for high volume engines.

Others have taught test methods and apparatus for measuring the torque or power output of an engine based on accelerating the engine, measuring the rate of acceleration, and computing the torque based on the inertia of the engine and the rate of acceleration. Such are taught, for example, in U.S Pat. Nos. 3,581,561, 3,817,092, 3,942,365, 3,994,160, and 4,356,725. However, these references are involved in determining a single torque or horsepower reading throughout the entire acceleration, that is, an average value. When considered in the context of the tolerances involved in testing a quantity of engines, such averaging may cause unacceptable engines to be passed.

Accordingly, it is a primary object of the invention described and claimed herein to provide a method for testing engines which will provide a quick yet reliable assessment of the power and/or torque capacity of the engine being tested.

Yet another object of the invention is to provide for such engine testing without using a costly power absorption device such as a dynamometer.

The above objects are specifically met in a dynamic engine test method wherein an engine of known rotating inertia is mounted in a test facility having means for measuring engine speed and comparing it to elapsed time. The test facility preferably includes an additional inertia member having a rotating inertia substantially larger than that of the engine drivingly coupled with the engine; a dedicated microprocessor to automatically control the operation of the engine, including throttle control and fuel shutoff; and a data processor to automatically acquire and analyze engine speed data at various points. Other parameters such as exhaust smoke opacity can also be acquired and processed. The test method comprises operating the engine at a low speed, accelerating the engine at full throttle to a predetermined high speed, such as high idle, without absorbing or dissipating power therefrom, measuring the engine speed and elapsed time to determine the angular acceleration at specific speeds in the operating range of the engine or during one or more relatively small discrete speed intervals or windows preferably corresponding to peak torque speed, an intermediate point, rated speed, and a speed between rated speed and high idle. The torque output of the engine may be calculated manually or preferably automatically for each speed interval based on the equation $T = I\alpha$ wherein $\alpha$ is the angular acceleration at that speed and the horsepower for a nominal speed in the interval may also be calculated based on the torque. Since the engine uses its full power capacity during a wide open throttle acceleration, the horsepower and torque at each speed will correlate to steady state values with a sufficiently high degree of accuracy to permit use of the method for production pass/fail testing.

Although not normally performed in practice, The test method may further comprise running the engine at a predetermined high speed, such as high idle, and shutting off the fuel supply. The engine will thus decelerate and, by measuring the deceleration at selected speeds or the deceleration across discrete intervals, the frictional or parasitic torque absorbed by the engine operating components, e.g., the bearings, can be also determined by the equation $T = I\alpha$.

Since the test method requires nothing more than accelerating the engine and repeating it a few times to average out errors, the test procedure can be accomplished very quickly. Moreover, since a dynamometer is not used the cost of the dynomometer and maintenance thereof is saved. Additionally, one does not face the problem about what to do with the power absorbed. This usually is wasted as heat by a resistance bank when a conventional dynamometer is employed. Since the torque and/or horsepower is measured at a number of points on the engine torque curve, accurate correlation to steady-state performance data results, and a high degree of confidence in the pass/fail test is obtained.

DESCRIPTION OF THE DRAWING

The drawing is a schematic diagram of an engine mounted in a test facility constructed in accordance with the invention.

DESCRIPTION OF PREFERRED EMBODIMENT

In its preferred embodiment, the invention is applied to the production testing of newly manufactured diesel engines, such as the naturally aspirated diesel engine 10 schematically illustrated in the drawings having a fuel injection pump 11 mounted thereto which supplies fuel to the engine in response to throttle position and which also governs high speed operation of the engine in a conventional manner. The injection pump 11 is further equipped with a conventional electric fuel shut-off device 14 and, for purposes of the invention, during the performance of the power assessment test method, the throttle remains in the wide open position and the fuel shut-off 14 is used to accelerate or decelerate the engine 10. The diesel engine 10 further has an exhaust stack 12 and is generally mounted in a test facility which provides all of the external systems necessary for normal engine operation, such as cooling, starting, fuel supply, exhaust system, etc. (not shown).

During its normal operation at full or wide open throttle, the diesel engine 10 characteristically follows, in response to the load applied, a lug or torque curve (torque vs rpm) beginning at a high idle speed, for example, 3300 rpm, controlled by the injection pump governor, followed by a rapid increase in torque with a slight decrease in speed to rated power speed, for example, 3000 rpm, at which the governor does not affect the fuel delivery or the power output, and at which the engine generally produces the maximum horsepower. From rated speed, the engine torque increases slowly with decreasing engine speed until the engine reaches peak torque speed, for example, 1500 rpm. Below peak torque speed, the torque capacity of the engine diminishes. The purpose of the test method and apparatus described herein is to assure that the mass production engines will produce the proper amount of torque and/or power at both rated power speed and peak torque speed and that the governor properly regulates torque or power capacity above rated power speed. Those of ordinary skill in the art will recognize that the test procedure described herein could be easily modified for use with other engines, for example, ungoverned diesel or gasoline engines which have no high idle speed.

Coupled to the flywheel 13 of engine 10 as by shaft 15 and driven thereby is an inertia member 16 or slave flywheel which is part of the production test facility. The inertia member 16 has a rotational inertia which is quite large in comparison to the rotating inertia of the engine 10 which may also have a flywheel. Preferably, the combined inertia of the member 16 and the engine 10 is about ten times that of the basic engine. Since the angular inertia of the inertia member 16 is accurately known, the error created by assuming an inertia for test purposes for each engine coming off the assembly line is reduced by a factor of ten. A toothed periphery wheel shown schematically at 17 is also a part of the test facility and may be incorporated in the inertia member 16. A conventional magnetic pickup 19 is positioned in close proximity to the toothed periphery of the wheel 17 and is electrically connected to a frequency-to-DC voltage converter 20 which will produce an output signal representing the engine speed. Due to the large inertia added by the inertia member 16, the engine 10 will have less cyclic speed variation, that is, the engine will not speed up and slow down as much as each cylinder fires. Accordingly, the speed output signal from the magnetic pickup 19 and DC-converter 20 will be of much higher quality and thereby provide more accurate data.

Although it is a major feature of the invention that the apparatus and test method do not utilize a continuous power absorbing device such as a dynamometer, it may be desirable to equip the test facility with a braking device to facilitate faster deceleration of the engine except when testing friction horsepower. The test facility also has a switch device and a solenoid control linkage (not shown) which control the engine throttle between low idle and full throttle positions.

The test facility further includes a control microprocessor 21 and a data processor 22. The control microprocessor 21 has two basic functions—control the test operation of the engine 10 and control the operation of the data processor 22. Both functions are accomplished using RPM logic circuits and to that end, the control microprocessor 21 is connected to the speed (RPM) output signal from the frequency-to-DC voltage converter 20.

The microprocessor 21 is programmed to automatically control the test operation of the engine 10 by identifying the engine speeds at which fueling is to change and providing an electrical signal to the electric fuel shut-off 14 on the injection pump 12 to accomplish that purpose. Additional safety shut-down sensors (not shown) also are connected to the microprocessor 21 which is programmed to terminate testing and stop the engine upon the occurrence of engine overspeed, low oil pressure, or overheating. The microprocessor 21 further is programmed to direct the data processor 22 to start data acquisition from the engine 10 as it accelerates or decelerates as will be hereinafter described in connection with the test method.

The preferred data processor 22 is a Norland 3001 Processing Digital Oscilloscope manufactured by Norland Instruments/Inotech, Inc., Ft. Atkinson, Wis. which is utilized primarily because of its ready availability and programmable data reduction and data output capability. The data processor 22 receives the RPM signal from the frequency-to-DC voltage converter and, as programmed, is capable of recalling each test cycle of data from memory, smoothing raw and processed data to reduce signal noise effects, differentiating the RPM signal and multiplying by the appropriate constants to obtain torque, computing mean torque for the programmed speed intervals, correcting torque for ambient conditions, computing horsepower at the programmed speed intervals, and running a pass/fail analysis relative to a predetermined specification for the engine. The data processor 22 may be further connected to an output device 24 such as a printer and/or a host computer, or pass-fail lights, or all three.

The data processor 22 is additionally connected to and receives an electrical input signal from a light extinction meter 25 disposed adjacent the engine exhaust 12 which measures the opacity or light obscuration of the exhaust smoke. The data processor 22 is also programmed to run a pass/fail analysis on the smoke values relative to predetermined specifications for the engine. The programming of the data processor and microprocessor is believed to be well within the skills of those in the art in view of the foregoing description and upon consideration of the preferred test method as described hereinafter.

In performing the test method, the engine 10 is mounted in the test facility, supplied with fuel and coolant, etc. and connected to the inertia member 16. The control microprocessor 21 is connected to the electric shut-off 14 of the injection pump 11 and other sensors such as oil pressure, are attached. The engine 10 is then started and warmed up while checking for fuel and oil leaks and gross engine malfunctions and adjusting the injection pump 11 to produce the proper low idle and high idle speeds.

At this point, the engine speed is reduced to low idle and the control microprocessor 21 is actuated while the throttle of the injection pump is moved by the test facility solenoid linkage to the wide open position thus causing the engine to begin a full throttle acceleration. As the engine accelerates to high idle, the control microprocessor 21 directs the data processor 22 to acquire engine speed and data including that obtained as the engine 10 passes through four discrete speed intervals or windows corresponding to four locations on the engine torque curve, that is, peak torque, an intermediate speed, rated power speed, the upper limit of the rated power window being below the governor set point, i.e., the point at which it begins to reduce the fuel delivery to the engine, and a speed between rated power speed and high idle speed. The data processor 22 digitizes the speed and elapsed time at 1 rpm intervals and computes the angular acceleration at each rpm point based on the speed and time difference from the previous point. The angular acceleration is determined at each point through the entire operating speed range and the resulting curve is digitally smoothed based on 15 point averaging, i.e. each point is readjusted based on the average of the point and the seven preceding and seven following points. Based on the smoothed curve, a mean instantaneous acceleration is determined for each of the four discrete speed intervals or windows. These intervals are quite short, less than 10% of the operating speed range and, preferably, are about 100 rpm in length to avoid averaging the angular acceleration values beyond that necessary to statistically filter out the effects of signal noise. Other methods of determining the acceleration in the windows are possible, for example, acceleration could be measured directly using an angular accelerometer or the frequency-DC voltage converter 20 could contain a solid state device to automatically differentiate the rpm signal to produce an acceleration signal. These alternatives, which might improve the accuracy of the data by reducing noise are as yet unproven in applicant's system.

Having determined the mean angular acceleration in each speed interval or window, the data processor 22 computes the mean torque T in the interval according to the equation $T = I\alpha$ where I is the known angular inertia of the inertia member 16 plus the assumed angular inertia of the engine 10. The data processor further corrects the mean torque data, if necessary, for variations in engine inlet air density due to ambient conditions by use of a curve fitting subroutine in accordance with Standard J-816B of the Society of Automotive Engineers except that indicated torque is used instead of fuel rate to arrive at indicated specific fuel consumption. The corrected engine brake horsepower for a specific engine speed in each interval is computed in each interval based on the corrected mean torques. The data processor 22 further receives an exhaust smoke opacity signal from the meter 25 and integrates the smoke curve over a standardized time interval, the area under the standardized smoke curve determining the acceptability of the engine.

When the engine 10 reaches a predetermined high speed such as high idle, the control microprocessor 21 shuts off the fuel to the engine by means of a signal to the electric shut off 14. The engine then coasts and gradually slows down. As the engine decelerates due to friction and parasitic loads through various predetermined speed intervals or windows, the mean instantaneous deceleration for each interval may be determined by the data processor in the same manner as the mean acceleration is determined. The mean friction torque may be computed for each window according to the equation $T = I\alpha$ but not corrected for ambient conditions. In practice, since the friction values only affect the S.A.E. ambient condition correction, which is based on indicated torque, it is considered unnecessary to measure friction for each engine tested and standard friction values for the engine model are used instead. Accordingly, a braking device might be used at this point to speed up the deceleration of the engine.

After the engine decelerates to a predetermined low speed, the control microprocessor 21 turns on the fuel and the engine 10 again accelerates to high idle while the data processor 22 records the engine speed data. The cycle is repeated preferably five times and the resulting brake and frictional (if determined) torque and horsepower values for each cycle are averaged. The control microprocessor then terminates the test either by stopping the engine with the electric shutoff or more preferably, by returning the engine to manual control at low idle. Meanwhile, the data processor 22 compares the corrected torque and horsepower and smoke data against a predetermined range for each parameter in each discrete interval or window and determines whether the engine has passed or failed its test. The results are transferred to the output device, a printer which prints out engine identification data, input data, SAE correction factor, corrected torques and horsepowers for each window, and pass/fail test for smoke. The same data can be fed to a central computer for permanent record keeping.

The primary advantage of the test method described herein is that it determines the shape of the torque and/or horsepower curves of the engine and thus provides data that can be accurately related to steady state values as opposed, for example, to measuring the time to accelerate from low idle to high idle which would only produce an average torque value having little reliability. This is especially true for naturally aspirated engines. With turbocharged engines, the fact that the exhaust driven turbocharger lags behind the engine at low speeds may produce a torque curve that has a significantly lower shape near the peak torque point of the curve. However, this lagging effect should be relatively constant for a specific engine-turbocharger combination and will be reduced for test purposes because the inertia member 16 will slow the rate of acceleration as described below. Accordingly, test data reliable enough for production testing of engines should nevertheless result.

It will also be apparent that the presence of the inertia member 16 substantially reduces the rate of acceleration compared to a bare engine. In an average engine 10, this would increase the acceleration time from low idle to high idle from about a half-second to about five seconds. This small increase in real time used for the test produces substantially better correlation of the test data to steady state data as the fuel injection system and the combustion system more nearly approach their constant speed operating characteristics throughout the transient test speed range. For example, the injection pump timing advance mechanism will have enough time to respond to the change in engine speed.

Thus, there has been described in accordance with the invention a method for Dynamic Engine Power Assessment which fully meets the objects, aims, and advantages set forth above. In view of the foregoing, those of ordinary skill in the art will recognize many modifications which can be made in either the test method or apparatus without departing from the true scope of the invention as defined by the appended claims.

What is claimed is:

1. A method of dynamically operating an engine to determine its steady state torque capacity comprising:

mounting an engine of assumed rotating inertia, I, in a test facility, said test facility having means for measuring engine speed and comparing it to elapsed time;

operating said engine at a low speed;

accelerating said engine at wide open throttle to a high speed;

determining the specific angular acceleration of said engine within two or more preselected discrete speed intervals between said low speed and said high speed, said intervals being less than 10% of the normal operating speed range of said engine; and computing engine torque for each of said discrete speed intervals according to the equation $T = I\alpha$ where $\alpha$ is said angular acceleration in said interval.

2. The invention according to claim 1 further comprising measuring said engine speed at a plurality of points during said acceleration and automatically differentiating said engine speed measurements to determine said angular acceleration.

3. The invention according to claim 2 and said engine having a speed range including peak torque speed, rated power speed, and a high idle speed, further comprising determining said angular acceleration at speed intervals at or adjacent said peak torque speed and said rated power speed, and between said rated power speed and said high idle speed.

4. The invention according to claim 1 further comprising running said engine at said high speed, cutting off the fuel supply to said engine, determining the angular deceleration during one or more discrete speed intervals, and computing average friction torque in said discrete speed intervals according to the equation $T = I\alpha$.

5. The invention according to claim 3 further comprising repeating the acceleration step and said acceleration determining step several times, and computing the torque in each of said intervals based on the average of the accelerations determined.

6. A method of dynamically testing a diesel engine to determine the acceptability of its performance without the use of a dynamometer comprising the steps of:

mounting an engine of assumed rotating inertia in a test facility, said test facility having means for measuring the rotating speed;

operating said engine at a low speed;

accelerating said engine at wide open throttle to a high speed without dissipating power therefrom;

measuring the engine rotational speed;

determining during said acceleration the specific angular acceleration of said engine at two or more test speeds above said low speed and below said high speed, said test speeds including at least a first speed corresponding to the rated power speed of said engine;

computing engine torque at each of said test speeds according to the equation $T = I\alpha$ wherein I is the angular inertia of said engine and members driven thereby and $\alpha$ is said determined acceleration; and comparing said computed torque to a predetermined torque for a standard engine and passing or failing said engine base on the deviation of said computed torque from said predetermined torque at each test speed.

7. The invention according to claim 6 wherein said angular acceleration is automatically determined from said engine speed measurement.

8. The invention according to claim 6 further comprising continuously measuring the opacity of the exhaust smoke of said engine over a predetermined speed range during said acceleration and passing or failing said engine based on the deviation between said smoke measurement and that predetermined for a standard engine.

9. A method of determining the acceptability for sale of one of a series of mass produced internal combustion engines, engines of said series having a predetermined average rotational inertial, I, comprising:

mounting a newly manufactured engine of said series on a test facility having means for measuring the speed of rotation of said engine and being characterized by the lack of a calibrated power absorbing and measuring device;

starting said engine and performing a gross evaluation of its operation;

operating said engine at a low speed;

accelerating said engine at wide open throttle to a high speed without dissipating power therefrom;

measuring the speed of rotation of said engine during said accelerating step;

determining during said accelerating step the mean angular acceleration of engine within at least two small discrete speed intervals corresponding respectively to at least two test speeds above said low speed and below said high speed;

computing engine torque at said test speeds according to the equation $T = I\alpha$ wherein I is said predetermined average rotational inertia of said engine series and portions of said test facility driven thereby and $\alpha$ is determined means acceleration in said discrete intervals;

comparing said computed torques to predetermined ranges of acceptable torques for said engine series; and rejecting said engine if said computed torques are outside said predetermined ranges.

10. The method according to claim 9 wherein said engine is a diesel engine further comprising performing the step of running the engine at high idle speed prior to performing said accelerating step.

11. The method according to claim 10 further comprising measuring the capacity of the exhaust smoke of said engine during said accelerating step, comparing said opacity to a predetermined range of acceptability for said engine series, and rejecting said engine if said measured opacity is outside said range.

* * * * *